United States Patent [19]
Nakano et al.
[11] 3,846,752
[45] Nov. 5, 1974

[54] CHARACTER RECOGNITION APPARATUS

[75] Inventors: Yasuaki Nakano, Hino; Kazuo Nakata, Kokubunji; Yuriko Uchikura, Nishitama, all of Japan

[73] Assignee: Hitachi, Ltd., Tokyo, Japan

[22] Filed: Oct. 2, 1972

[21] Appl. No.: 294,179

[52] U.S. Cl. .................. 340/146.3 Q, 340/146.3 H
[51] Int. Cl. .......................................... G06k 9/02
[58] Field of Search ........... 340/146.3 Q, 146.3 P, 340/146.3 H, 146.3 AQ

[56] References Cited

UNITED STATES PATENTS

| | | | |
|---|---|---|---|
| 2,679,636 | 5/1954 | Hillyer | 340/146.3 Q |
| 3,064,519 | 11/1962 | Shelton | 340/146.3 P |
| R26,104 | 11/1966 | Glauberman et al. | 340/146.3 Q |

*Primary Examiner*—Gareth D. Shaw
*Assistant Examiner*—Joseph M. Thesz, Jr.
*Attorney, Agent, or Firm*—Craig & Antonelli

[57] ABSTRACT

Character recognition apparatus wherein projection pattern signals obtained by projecting the density distribution of a printed or typed character on two axes orthogonal to each other are transformed into frequency spectrum patterns by a Fourier transform unit, the transformed signals are compared with a number of standard frequency spectrum pattern signals which correspond to a number of standard characters and which are obtained by a method similar to the foregoing one, and the standard character corresponding to the frequency spectrum pattern of the highest degree of similarity is outputted as a recognized character.

6 Claims, 14 Drawing Figures

| | |
|---|---|
| FIG. 5A | 圧 |
| FIG. 5B | 囲 |

FIG. 6A

| CHARACTER / CORRELATION | | 「愛」 | 落 | 配 | 塩 | 葉 | 泌 | 酸 | 面 | 救 | 経 | 食 |
|---|---|---|---|---|---|---|---|---|---|---|---|---|
| HORIZONTAL | 1-31 | 972 | 965 | 963 | 962 | 962 | 961 | 960 | 959 | 959 | 959 | |
| | 2-14 | 965 | 956 | 939 | 946 | 963 | 961 | 951 | 946 | 930 | 937 | |
| VERTICAL | 1-31 | 976 | 881 | 924 | 981 | 902 | 785 | 881 | 870 | 822 | 972 | |
| | 2-14 | 901 | 917 | 948 | 814 | 902 | 765 | 860 | 832 | 751 | 805 | |

FIG. 6B

| CHARACTER / CORRELATION | | 「悪」 | 首 | 省 | 炭 | 屋 | 銭 | 著 | 唱 | 習 | 前 | 衛 |
|---|---|---|---|---|---|---|---|---|---|---|---|---|
| HORIZONTAL | 1-31 | 976 | 974 | 968 | 963 | 959 | 959 | 957 | 957 | 956 | 955 | |
| | 2-14 | 976 | 970 | 949 | 952 | 944 | 933 | 948 | 938 | 944 | 952 | |
| VERTICAL | 1-31 | 948 | 980 | 945 | 981 | 975 | 779 | 902 | 881 | 975 | 883 | |
| | 2-14 | 652 | 804 | 880 | 907 | 771 | 869 | 821 | 804 | 771 | 863 | |

FIG. 6C

| CORRELATION \ CHARACTER | | 「雲」 | 禁 | 景 | 設 | 置 | 買 |
|---|---|---|---|---|---|---|---|
| HORIZONTAL | 1-31 | 967 | 958 | 957 | 952 | 951 | |
| | 2-14 | 958 | 952 | 952 | 952 | 953 | |
| VERTICAL | 1-31 | 958 | 936 | 966 | 960 | 950 | |
| | 2-14 | 952 | 643 | 831 | 820 | 765 | |

FIG. 6D

| CORRELATION \ CHARACTER | | 「貝」 | 喜 | 景 | 庫 |
|---|---|---|---|---|---|
| HORIZONTAL | 1-31 | 973 | 951 | 948 | |
| | 2-14 | 973 | 927 | 909 | |
| VERTICAL | 1-31 | 965 | 928 | 910 | |
| | 2-14 | 963 | 754 | 683 | |

CHARACTER RECOGNITION APPARATUS

BACKGROUND OF THE INVENTION

1. Field of the Invention

The present invention relates to character recognition apparatus, and more particularly to character recognition apparatus suitable for recognition of printed or typed Chinese characters.

2. Description of the Prior Art

As a procedure of the pattern or character recognition, (consisting of mesh points quantized into either the highlight level 0 or the dark level 1) is transformed into patterns by projecting the first-mentioned pattern on two axes (the transformed patterns being hereinafter termed the peripheral distributions), and the peripheral distribution patterns are utilized.

More specifically, the character pattern at the time when the density at each of the mesh points divided in the vertical and horizontal directions is quantized into 1 or 0 of two values is projected in the horizontal or vertical direction, to respectively obtain the vertical peripheral distribution or the horizontal peripheral distribution. The degree of correlation or similarity is calculated between the above peripheral distribution of the unknown input character and the peripheral distribution of each standard character (each character which the recognition apparatus can recognize). The standard character giving the maximum value of the correlation is outputted as the recognized character of the unknown input character.

Since, however, the prior-art apparatus directly uses the peripheral distributions themselves of the unknown input character and the standard characters, the characteristic patterns are not normalized with respect to a positional shift of the unknown input character. For this reason, the final judgement should disadvantageously be passed in such way that one of the input and standard patterns is moved relatively to the other and that the position at which the degree of correlation or similarity is maximal is sought for.

SUMMARY OF THE INVENTION

It is accordingly the principal object of the present invention to render the processing of recognition high in speed in character recognition apparatus utilizing the peripheral distributions of characters, in such manner that the peripheral distributions are transformed into information (characteristic patterns) invariable to positional shifts, whereupon they are subjected to matching with standard patterns processed in the same way.

In order to accomplish the object, the present invention projects the density distribution of a character represented on a two-dimensional plane onto at least one axis, to obtain the peripheral distribution of the character and the transform it into an amplitude spectrum pattern. The amplitude spectrum pattern of each standard character as is stored in the apparatus and that of an unknown input character are compared, to evaluate the correlation value between both the patterns. The standard character having the standard amplitude spectrum pattern of the highest degree of correlation is outputted as a recognized result of the apparatus.

The above-mentioned and other features and objects of the invention will become more apparent by reference to the following description taken in conjunction with the accompanying drawings.

BRIEF DESCRIPTION OF THE DRAWINGS

FIGS. 5A, 5B, 6A, 6B, 6C and 6D illustrate various Chinese characters and tables of characters and numbers referred to in this specification.

DESCRIPTION OF THE PREFERRED EMBODIMENT

The principle of the present invention will be explained previous to description of an embodiment thereof.

Figure 1A:
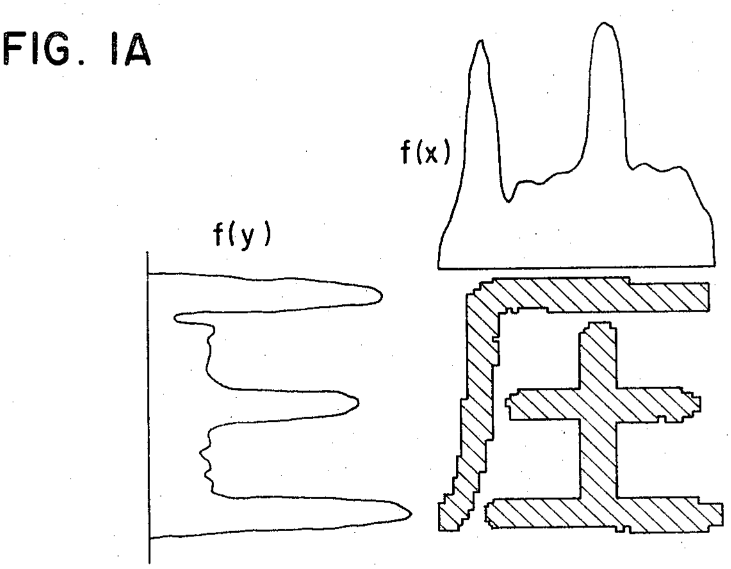
FIGS. 1A and 1B are diagrams showing examples of Chinese character patterns and projection or peripheral patterns.
Figure 1B:
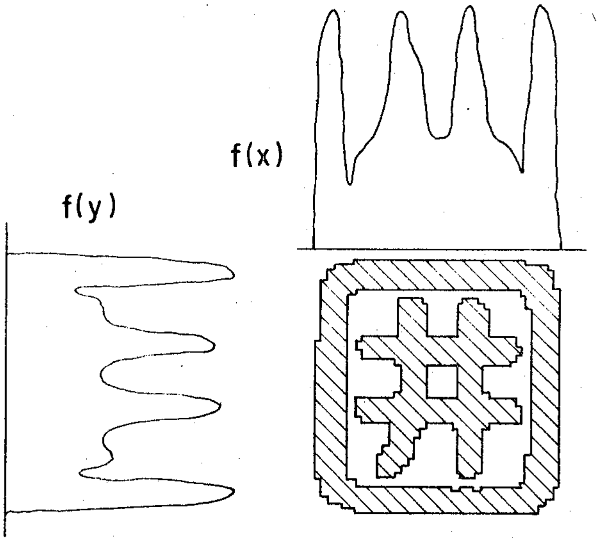

FIGS. 1A and 1B illustrate character patterns and horizontal peripheral distributions (projections on the vertical axis) as well as vertical peripheral distributions (projections on the horizontal axis) produced from the character patterns in the case where the Chinese characters seen in FIG. 5A ("press" in English) and seen in FIG. 5B ("enclosure" in English) are divided into 50 meshes in each of the horizontal and vertical directions and where the density at each mesh point is quantized to a binary value of 1 or 0.

Herein, the vertical peripheral distribution is represented by $f(x)$ as a function of positions $x$, while the horizontal peripheral distribution by $f(y)$ as a function of positions $y$. As a method of transforming the functions of the positions into functions independent of the positions, it is possible 1. to conduct the Fourier transformation to change them into amplitude spectra, or
2. to transform them into auto-correlation coefficients.

Since $f(x)$ and $f(y)$ are the same in nature, the former will be described hereunder.

First, the Fourier transformation of the function $f(x)$ is defined by the following equation:

$$F(\omega) = \int_{-\infty}^{\infty} f(x) e^{-j\omega x} dx \quad \text{(complex number)}$$

The shift $\Delta x$ of the position $x$ appears as the phase rotation $e^{-j\omega\Delta x}$ of a spectrum $F(\omega)$. However, the phase difference is neglected by evaluating an amplitude spectrum $A(\omega)$ or an energy spectrum $P(\omega)$, and information invariable to the positional shift are obtained. More specifically, $$A(\omega) = |F(\omega)| = [F(\omega) \cdot F(\omega)^*]^{1/2} \quad \text{(real number)}$$

or $$P(\omega) = F(\omega) \cdot F(\omega)^* = A(\omega)^2 \quad \text{(real number)}$$

where the mark * signifies to take the conjugate complex number.

The auto-correlation coefficient of $f(x)$ is defined by the following equation:

$$\delta(\tau)=\int_{-\infty}^{\infty} f(x)f(x+\tau)dx$$

$\delta(\tau)$ is a function of only $\tau$, and is independent of the position $x$. Wiener-Hinchin's theorem is held between $\delta(\tau)$ and $P(\omega)$, and indicates that they are equivalent as information.

A difference resides, however, in that a region of smaller $\omega$ represents a lower frequency component of $f(x)$ in $A(\omega)$, whereas a region of smaller $\tau$ describes the correlation of a higher frequency component in $f(x)$ in $\delta(\tau)$.

Since information required for recognition of $f(x)$ are concentrated on comparatively low frequency components as will be hereinafter seen in concrete examples, the amplitude spectrum $A(\omega)$ taking the absolute value of the Fourier transformation spectrum shall be considered herein.

Secondly, there will be considered how the principal information of $f(x)$ are held and sampled in $A(\omega)$.

Figure 2A:
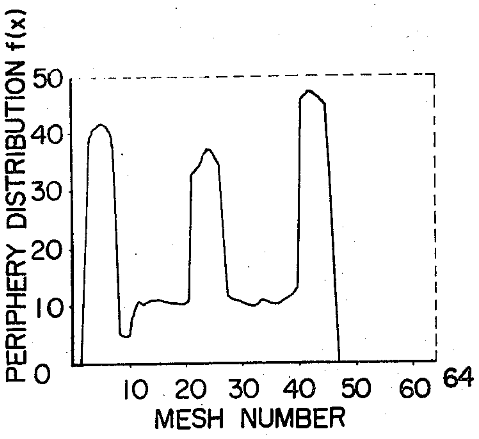
FIGS. 2A and 2B illustrate an example of projection pattern and its normalized amplitude spectrum.
Figure 2B:
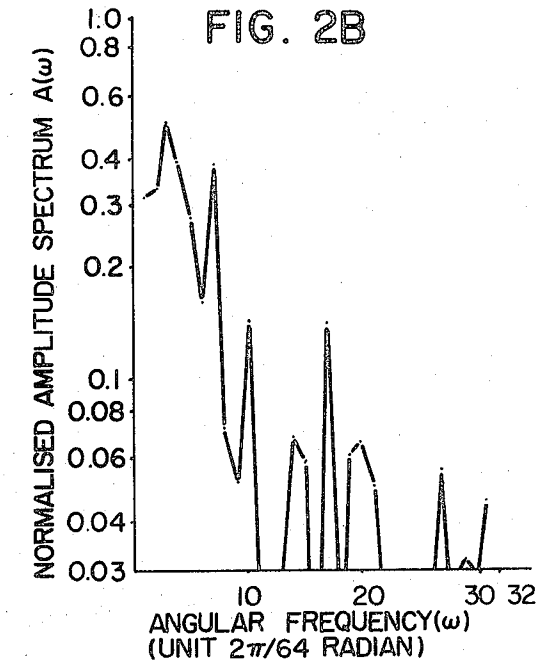
Figure 2C:
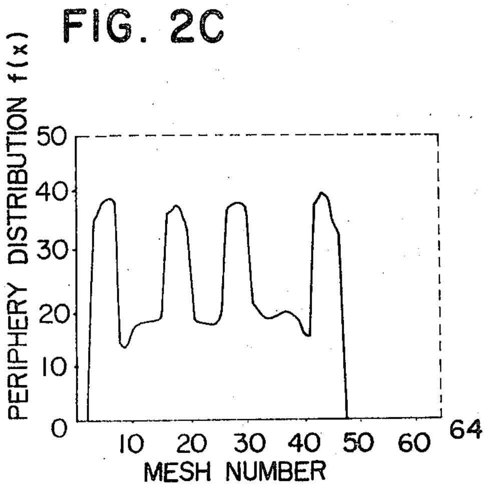
FIGS. 2C and 2D (illustrate another example of projection pattern and its normalized amplitude spectrum.
Figure 2D:
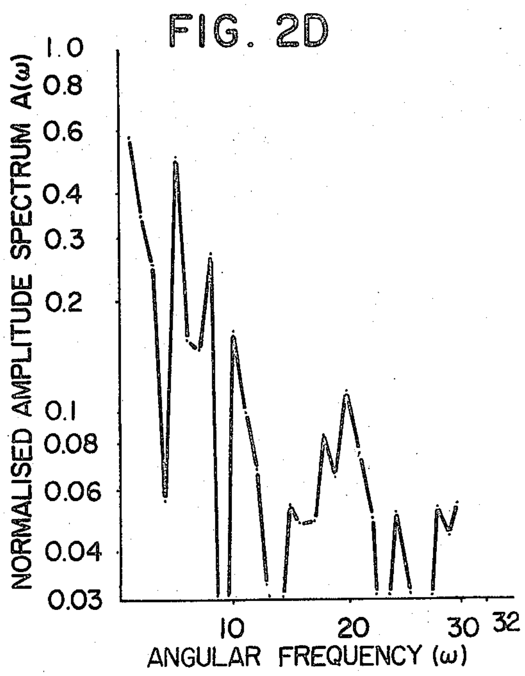

The examples of the normalized amplitude spectrum $A(\omega)$ corresponding to the peripheral distribution $f(x)$ in the cases of Chinese characters seen in FIGS. 5A and 5B are illustrated in FIGS. 2A to 2D. In FIGS. 2A and 2C, the units of the axes of abscissas and ordinates of the peripheral distribution $f(x)$ are the numbers of meshes. In FIGS. 2B and 2D, the axis of abscissas of the normalized amplitude spectrum $A(\omega)$ represents the angular frequency $\omega$. The unit of the calculation is conducted at the sample points of: $\omega_0, \omega_1, \omega_2, \ldots \omega_{31}$. These sample points of angular frequency are represented as $\omega_i = (2\pi/64)i$(radian),
$(i = 0, 1, 2, \ldots 31)$, and $i$ denotes the ordinance number of the sequence: $\omega_0, \omega_1, \ldots \omega_{31}$.

The terms "the normalized amplitude spectrum" means one obtained by normalization with a value root-mean-square of the value of all channels.

It is understood from FIGS. 2A to 2D that the features of $f(x)$ are reflected well in $A(\omega)$. For example, the peak of $A(\omega)$ at $i = 3$ (which corresponds to the angular frequency $\omega_1 = 2\pi/64 \times 3 \approx 2\pi/20$, namely, a frequency of 1/20), by the relation $\omega = 2\pi f$ between the angular frequency $\omega$ and the frequency $f$) in FIG. 2B corresponds to the fact that three pulses are repeated at a period of approximately 20 in $f(x)$ in FIG. 2A. The peak of $A(\omega)$ at $i = 5$ ($\omega i = 2\pi/64 \cdot 5 \approx 2\pi/12$, namely, a frequency of 1/12) in FIG. 2D corresponds to the fact that four pulses are repeated at a period of approximately 12 in $f(x)$ in FIG. 2C. In FIG. 2B, the envelope of $A(\omega)$ exhibits such shape that it is attenuated till $i = 10$ ($\omega i = 2\pi/64 \cdot 10 \approx 2\pi/6$, namely, a frequency of 1/6) and that it rises again. This corresponds to the power spectrum of a pulse having a width of 6 units. Since the width of a pulse is slightly smaller in FIG. 2D, the envelope extends to a higher frequency portion than in FIG. 2B. In this manner, the features of the peripheral distribution $f(x)$ are represented well in $A(\omega)$.

Thirdly, there will be considered what range of $A(\omega)$ information necessary for separation and discrimination between the peripheral distributions $f(x)$ are distributed in on the whole.

Figure 3:
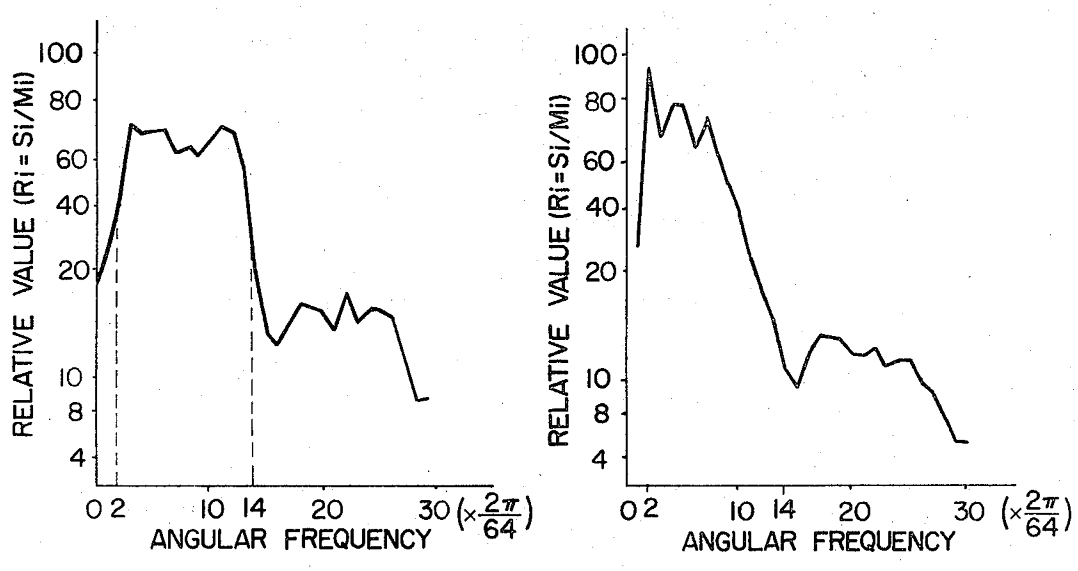
FIG. 3 is a diagram showing the presence of principal frequency bands in spectra.

For the sake of simplicity, it is assumed that analyzed outputs at the respective representative frequency points $\omega i = (2\pi/64)i$ $(i = 0, 1, \ldots, 31)$ of the spectrum are independent of one another. The degree of contribution to the discrimination can be estimated by the mean value of the extent to which the output changes by changes of characters. The ratio between the dispersion $S_i$ and the mean value $M_i$ when the standard pattern of the Educational Chinese Characters, 881 characters (established in Japan), is therefore calculated for each value of $\omega i$. The results are shown in FIG. 3. The ratio $R_1 = S_i/M_i$ is a criterion indicating the product between the rate of that component in the mean output at the frequency $\omega i$ which is considered effective for separation and discrimination among the characters and the absolute magnitude thereof. As the value of the ratio is larger, the component is considered to be more effective for the recognition. In view of the results in FIG. 3, it is apparent that the region of $\omega i = 2$ to 13 or 14 (the unit being $2\pi/64$ radian) is the most effective frequency band. In other words, the principal information are contained at the part at which the angular frequency ranges from about 0.2 to about 1.4 radian.

The information of the two-dimensional pattern of $N^2$ bits has the number of bits reduced to $2N \log_2 N$ bits by taking the peripheral distributions. The quantity of information is further reduced by taking the Fourier amplitude spectra of the peripheral distributions and considering only the principal frequency bands thereof.

In the example herein described, N = 50, and there are thirteen principal frequency bands of 2 – 14. Accordingly,

| | | | |
|---|---|---|---|
| Original Character Pattern | : | 50 × 50 × 1 bits | : 1 |
| Peripheral Distribution | : | 2 × 50 × 6 bits | : ¼ |
| Spectrum | : | 2 × 13 × 7 bits | : 1/14 |

As concrete examples proving correctness of the various assumptions mentioned above, examples of correlative values among the Fourier amplitude spectra of the peripheral distributions are listed in FIGS. 6A through 6D. In the case where the calculation is conducted for the whole region of $i = 1 - 31$ for $\omega i$ ($\omega_0$ is the mean value dependent on the size of the character, and is excluded) and the case where the calculation is conducted at only the thirteen points of 2 – 14 are compared and mentioned. The data were prepared in such way that, among all the 881 Educational Chinese Characters for which the calculation was carried out, those having large correlative values (being prone to errors) were sampled. The case of $i = 2 - 14$ provides an easier separation for most characters.

In FIGS. 6A through 6D, each character in [ ] is an input character, while characters in the right column are ones greatly correlative to the corresponding input character.

On the basis of the examples of the numerical values, the following can be said as a conclusion.

Using the Fourier amplitude spectra of the peripheral distributions as characteristic patterns it is possible to carry out recognition of printed or typed Chinese characters (in the single font). The features of this system are:

1. The recognition can be conducted irrespective of the position shift of the input pattern.

2. Only the principal frequency bands in the spectra are compared, whereby the quantity of information to be processed is compressed to 1/10 or less as compared with that of the original pattern without degrading the separating and discriminating capability among characters. The capacity of a standard pattern memory can be reduced to that extent, and therewith, the recognition processing can be rendered high in speed.

The present invention will be described in detail hereunder in conjunction with an embodiment.

Figure 4:
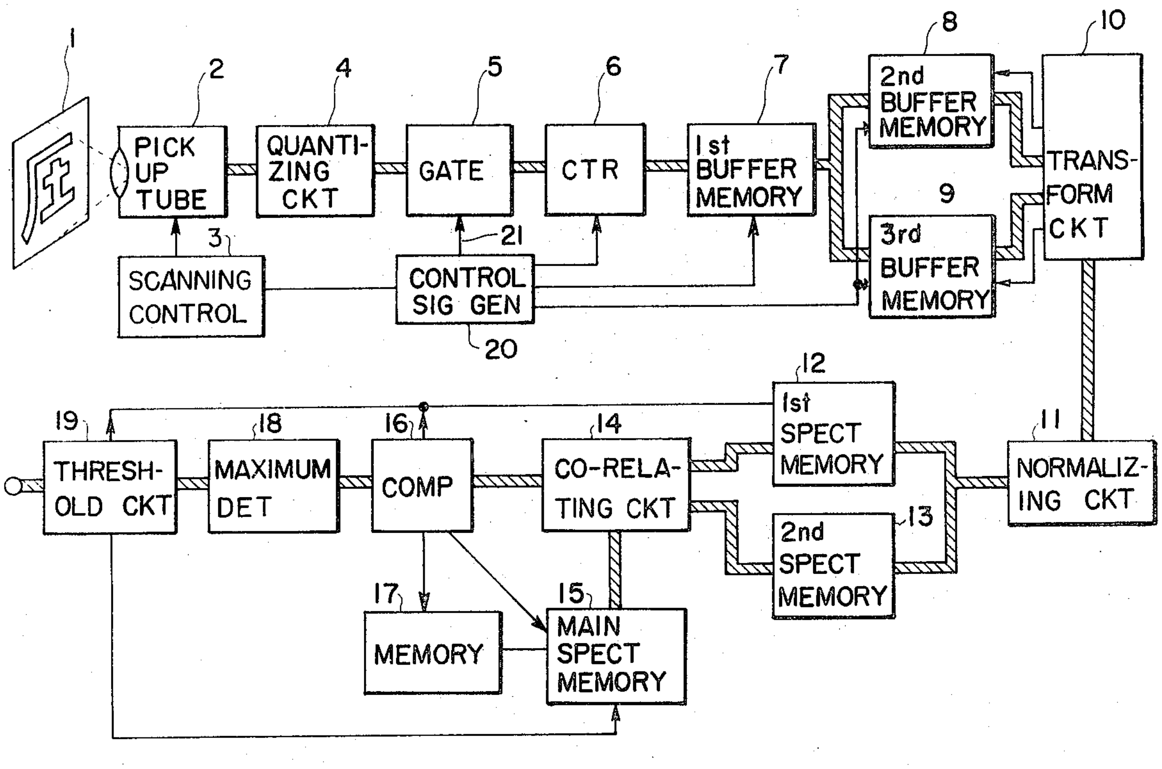
FIG. 4 is a block diagram showing the construction of an embodiment of character recognition apparatus according to the present invention.

A block diagram of a Chinese character recognition apparatus based on the principle of the present invention is shown in FIG. 4.

In the figure, thick lines indicate the flows of information, while fine lines the flows of control.

A character (unknown input character) printed on paper 1 is converted into an electrical signal by means of a photoelectric converter or pickup tube 2. The photoelectric conversion image is subjected to horizontal and vertical scannings under the control of a scanning control 3. The number of scanning lines is made, for example, 50 per character in both the horizontal and vertical directions.

The output of the photoelectric converter is quantized into a digital signal of the two levels of 0 (highlight level) and 1 (dark level) by means of a threshold circuit or two valued quantizing circuit 4. A gate circuit 5 is opened and closed by the output, to transmit fundamental clocks 21 to a counter 6 for counting. Generation of the fundamental clocks and various controls synchronized therewith, such as the change-over between horizontal and vertical scanning modes, initiation and termination of one scanning, transmission of the output of the counter 6 into a buffer memory 7, and resetting of the counter 6, are conducted by control signals from a control signal generator 20. Assuming that the number of characters to be read in 1 second is $n$, that the resolution in both the horizontal and vertical directions is N and that the required retrace time amounts to $r$ percent of the scanning time, the frequency $f_o$ of the fundamental clocks is:

$$n \cdot N^2 (1 + 0.01 \times r)^2 \text{ (Hz)}$$

If $n = 10^3$, $N = 50$ and $r = 1$, the frequency is approximately 25MHz.

The number of clock pulses counted within one scanning period gives the very value of the peripheral distribution at the particular point, so that the value is fed into the first buffer memory (shift register) 7 at every termination of the scanning. That is, the information of $f(x)$ or $f(y)$ in FIGS. 1A and 1B are recorded. The number of bits of the counter 6 as well as the shift register 7 may be, in the binary code, the minimum integer L satisfying $L \geqq \log_2 N$, where N represents the resolution or the number of meshes. For example, if N = 50, L is 6, that is, the value of 6 bits is satisfactory. As regards the capacity of the shift register 7, 6 bits × 50, namely, 50 stages of 6 bits suffice from the above condition.

When the horizontal or vertical scanning is completed, the change-over of the scanning mode is carried out. Simultaneously therewith, the contents of the buffer memory 7 are transferred to either the second buffer memory 8 or the third one 9 at the next stage.

As to the sequence of the scannings, since the quantity of information is larger in the peripheral distribution in the horizontal direction than that in the vertical direction particularly in the case of Chinese characters, it is advisable to conduct the horizontal scanning first.

The reason why the two intermediate buffer memories 8 and 9 are provided, is that the whole recognition processing requires more time in the spectral transformation and the correlation processing at later stages than in taking-in of inputs. If the processings at the later stages are conducted at higher speeds and the taking-in of inputs is a neck point, a single intermediate buffer suffices.

If the recognition of the preceding character is completed, the peripheral distribution in the horizontal direction as fed into the intermediate buffer 8 is instantly supplied to a Fourier transform circuit 10 and is transformed into a Fourier spectrum. The Fourier transform circuit may be the same in principle as one being already commercially available as referred to below. The required time for the transformation of an input of 64 points is considered to be within approximately $1_m$ sec.

The fourier transform unit is already known, and is, for example, Model TD90A High Speed Fourier Transform Unit manufactured and sold by Time Data Inc. in U.S.

An analyzed output subjected to the Fourier transformation and tranformed into the amplitude spectrum is transformed into a normalized amplitude spectrum by a frequency selection and normalization circuit 11.

Letting the lower limit of the frequency selection be $N_L$ and the higher limit to be $N_H$, the normalized amplitude spectrum A(I) is defined as follows:

$$A(I) = \frac{a(I)}{\sqrt{\sum_{i=N_L}^{N_H} a(i)^2}}$$

$$I = i - N_L + 1,\ i = N_L, \ldots, -N_H$$

where a($i$) represents the Fourier transform amplitude spectrum.

In the concrete examples previously mentioned, $N_L = 2$ and $N_H = 14$. Upon completion of the calculation of the spectrum of the horizontal peripheral distribution, the operation is shifted to the transformation of the vertical peripheral distribution.

The normalized amplitude spectrum of the horizontal peripheral distribution is immediately and once stored in a spectrum memory 12 (that of the vertical one s stored in a spectrum memory 13). The capacity of the memory is 7 bits × 13 = 9 bits assuming, e.g., 13 channels and 100 levels of a level range of 1.0 – 0.01.

The normalized amplitude spectrum has the correlation of the following equation calculated by a correlation circuit 14 between it and those of standard patterns stored in a main memory 15. The value of the correlation $\rho j$ between the unknown input and the standard pattern of a character which is represented by a sequence number J, which is calculated as follows, is fed to a comparator 16.

$$\rho_J = \sum_{I=1}^{K} X_H(I) x S_H(J, I)$$

where $X_H(I)$ indicates the normalized amplitude spectrum of the horizontal peripheral distribution of the unknown input character, while $S_H(j, I)$ the normalized amplitude spectrum of the standard horizontal peripheral distribution of a character j. K equals to $N_H - N_L + 1$.

From the definition of the normalized amplitude spectrum, $\rho j$ 1. The correlation becomes maximum when the unknown character X is equal to the character *j*.

Among the correlation values previous to the character *j*, at most ten greater ones are stored in the comparator 16. The values are compared with the value $\rho j$ inputted anew, and all these values are put in order in dependence on the magnitude. Ten greater values in the new order are stored in a memory 17.

The processing is repeated. When the comparisons have been thereby made for all the standard characters, e.g., the 381 Educational Chinese characters, ten of the greatest correlations among them are stored in the memory 17.

Then, the comparing operation is changed-over to that of the normalized amplitude spectrum of the vertical peripheral distribution. Herein, the calculation of the correlation is conducted for only the ten standard characters stored in the memory 17. The result is fed to a maximum detector 18. The maximum detector 18 seeks for the maximum value from among the ten correlation values, and supplies it to a threshold circuit 19 at the next stage. If the maximum value is greater than a predetermined threshold value $\theta$, the character number *j* giving the maximum correlation value is outputted as a reliable recognition result.

When the threshold value $\theta$ is not exceeded, the fact is fed-back. This time, the correlation and comparison processings are repeated from the normalized spectrum of the vertical peripheral distribution.

If any correlation value greater than the threshold value is not yet detected, the input character is rejected as being unreadable.

As described above, according to the present invention, the quantity of information of a pattern is compressed to 1/10 or less. Moreover, recognition of a character can be conducted without any influence by a positional shift of the unknown input. The compression of the quantity of information not only renders the calculation of correlation highly speedy and the recognition processing highly speedy, but also allows the capacity of memory of standard patterns to be reduced at that rate. Accordingly, it serves for simplification of apparatus and reduction of cost.

In the foregoing embodiment, description has been made of the method in which ten candidates for giving the maximum correlation value are always taken out. However, a method is also possible in which a certain threshold value is previously set, and correlation values exceeding the set value are stored as candidates. This method is simpler in the hardware of the apparatus.

In the present invention, description has been made of the method in which both the horizontal and vertical peripheral distributions are used. In some intended uses, however, it is also possible to use either one to simplify the apparatus.

We claim:

1. Character recognition apparatus which comprises a. means to obtain a peripheral distribution pattern of an unknown input character by projecting the density distribution of said character on at least one axis, b. means to obtain an amplitude spectrum pattern of said peripheral distribution pattern, c. memory means for storing a number of standard amplitude spectrum patterns corresponding to a number of standard characters, d. comparator means for comparing said standard spectrum patterns stored in said memory means and said amplitude spectrum pattern of said unknown input character and providing a correlation value between both the patterns, and e. output circuit means for deriving as the unknown input pattern the standard character corresponding to the standard amplitude spectrum pattern which attains the maximum one of a number of correlation values obtained by said comparator means.

2. Character recognition apparatus according to claim 1, further including means to sample a spectral component of a specific part within an angular frequency region $0 - 2\pi$ of said amplitude spectrum pattern of said unknown input character, the angular frequency region of each of the standard spectra corresponding to said standard characters stored in said memory being the same as the sampled frequency region of said unknown input character at said specific part.

3. Character recognition apparatus according to claim 2, wherein said angular frequency region of said specific part ran as from 0.2 radian to 1.4 radian.

4. Character recognition apparatus according to claim 1, wherein said at least one axis from the projection consists of the axes orthogonal to each other, the vertical and horizontal density distributions of said unknown input character being respectively projected on said axes.

5. Character recognition apparatus which comprises a. a photoelectric converter which periodically scans an unknown input character in successive scanning periods to convert it into an electric signal, b. a quantizing circuit connected to said photoelectric converter which quantizes said electric signal into two values in response to detected signal levels, c. a gate circuit connected to said quantizing circuit which opens and closes a circuit providing a clock signal in response to the output signal levels of said quantizing circuit, d. a counter connected to said gate circuit for counting the outputs of said gate circuit during each scanning period, e. a first buffer memory connected to said counter which stores an output of said counter in the form of a projection pattern representative of a peripheral distribution, f. A Fourier transform unit connected to receive an amplitude spectrum from said buffer memory, g. a buffer spectrum memory which stores an output of said Fourier transform unit, h. main memory means for storing amplitude spectra corresponding to a number of standard characters i. comparator means for calculating the degree of correlation between the amplitude spectrum from said main memory and the amplitude spectrum of said buffer spectrum memory, j. output circuit means connected to said comparator means for providing the standard character of the highest degree of correlation as a recognized output on the basis of the degrees of correlation evaluated by said comparator means, and k. control circuit means which generates signals for controlling the respective circuits.

6. Character recognition apparatus according to claim 5, wherein a. said buffer spectrum memory comprises first and second memory parts which store the vertical and horizontal amplitude spectrum patterns of said unknown input character, b. said comparator being additionally provided with a memory circuit which stores a plurality of standard characters of higher degrees of correlation, and c. the comparisons for all said standard characters are first conducted as to one of the horizontal and vertical amplitude spectra, to thereby select a plurality of standard characters of higher degrees of correlation, and the comparisons for only the selected standard characters and subsequently conducted as to the other amplitude spectrum.

* * * * *